| United States Patent Office | 2,893,887 |
|---|---|
| | Patented July 7, 1959 |

2,893,887

LONG FLOW CARBON

Andries Voet, Borger, Tex., assignor to J. M. Huber Corporation, Borger, Tex., a corporation of New Jersey No Drawing. Application May 3, 1954
Serial No. 427,340

16 Claims. (Cl. 106—307)

This invention relates to carbon black and more particularly to a method for enhancing the flow characteristics of carbon. More particularly, the present invention relates to a process for altering the surface properties of carbon black which alteration is manifested by increase in its flow imparting characteristics when incorporated in a fluid matrix and to carbon black so modified.

The flow imparting characteristics or flow characteristics of carbon black are of great importance in the ultimate uses to which a particular carbon black may be put. The property of length when carbon black is incorporated in a fluid matrix is most desirable. There are several ways in which this desirable property has been attained but all, so far as now known, attain the result at significant disadvantages in both cost and efficient utilization of material.

The flow imparting characteristics of carbon black are apparently a surface phenomenon, being controlled largely by the nature of the surface of the carbon black particles and relatively independent of density or particle size over relatively large ranges.

The flow imparting characteristics possessed by carbon black are manifest only when that carbon black is incorporated in suspension in an oily vehicle. Qualitative possession of good flow imparting characteristics by a carbon black is often referred to as "length," the particular carbon being said to possess length or "long flow." Determination of whether a particular carbon black possesses the quality of length or long flow may be determined by preparing a dispersion of about 22 parts carbon in 78 parts linseed oil or about 15 parts carbon in 85 parts of a mineral oil containing a dispersing agent as for example gilsonite. Such dispersion of carbon black having length or long flow will when taken up on a spatula flow in a long string and the flowed dispersion will rapidly assume a smooth uniform surface. A similar dispersion of a carbon not having length or long flow will be in the form of a soft buttery mass which, taken up on a spatula, will drop in one lump therefrom and the surface of the lump will retain its markings and surface irregularities for an indefinite length of time. Quantitative methods for determination of the length or flow characteristics of carbon black are described below.

In the channel process, carbon black is prepared by the impingement of smokey flames of natural gas against a metallic collecting surface from which the carbon black is scraped. In the furnace process natural gas or hydrocarbon oils are burned in a furnace with insufficient air for complete combustion and the resulting carbon is collected from the gas stream in bag filters or with electrical precipitators. The bulk of the carbon black employed in the manufacture of paint or ink is produced by the channel process where the quality of the impingement carbon may be controlled by the shape of the flame, the distance from the collecting surface and by the quality of the gas.

Ordinary channel black such as that employed in the compounding of rubber or in the preparation of the lowest grade of printing ink such as news ink is prepared by burning natural gas in burner tips which produce a flat flame, the burner being about 2½ inches below the collecting surface. This operation will produce about 2 pounds of carbon per 1000 cubic feet of gas but carbon prepared by such operation has very poor flow imparting properties, making it unsuitable for employment in those uses where good flow characteristics are important or desirable. In order to produce carbon which has longer flow the tips are placed farther from the collecting surface so that more of the gas is burned and less carbon is recovered. Some of the higher quality of carbon is prepared by burning the gas in round flames with the tip five or six inches below the collecting surface. In this case, the yield per 1000 cubic feet of gas may be no more than 0.1 pound of carbon with the result that the production from such a plant is very low and the carbon is very expensive. However, such high quality, low yield carbon possesses length.

It is an object of this invention to provide an inexpensive carbon which possesses long flow properties in oily dispersions. A further object is to provide a particulate carbon black having a modified surface area imparting increased flow characteristics to its dispersions in oils. Another object is to provide a method for treating short flow carbons to alter their surface character so as to increase their length. A still further object is to provide a method for enhancing flow imparting characteristics of carbon black.

The present invention involves adsorbing on carbon black a relatively small amount of alkaline earth mahogany sulfonate. Mahogany sulfonates, sometimes known as mahogany acids, are formed during refining of lube or white mineral oils with sulfuric acid and may be converted into their alkaline earth salts. The alkaline earth (calcium, barium and strontium) salts of mahogany sulfonates are oil soluble substances.

Carbon black may be treated with alkaline earth mahogany sulfonate in any convenient manner such as by grinding or intimately mixing the alkaline earth mahogany sulfonate with carbon in the dry form or by treating the carbon with a solution of the salt in an oily solvent such as benzene, pentane, hydrocarbon fraction, linseed oil or other petroleum, vegetable or animal oils. When mixing in the dry form is carried out, heating the mixture to a temperature between room temperature and 150° C. is preferred to facilitate uniform adsorption of the alkaline earth mahogany sulfonate on the surface of the carbon. At such elevated temperatures, the vapor pressure of the alkaline earth mahogany sulfonate is increased.

When treating the carbon black with an oily solution of alkaline earth mahogany sulfonate, the amount of solvent may be varied over a wide range. The resulting product may vary in form from an apparently dry particulate free flowing carbon black to a relatively dilute suspension of carbon black in the oil employed as a solvent for the alkaline earth mahogany sulfonate. In any case, alkaline earth mahogany sulfonate is adsorbed on the carbon black. For example, carbon black treated with a relatively large proportion of a solution of alkaline earth mahogany sulfonate in an oily solvent when recovered from suspension in the oily medium, as for example by filtration, contains a substantial portion of alkaline earth mahogany sulfonate adsorbed thereon.

A particular advantage attainable according to this invention is that particulate pulverulent carbon black, treated according to this invention but having the same handling properties as untreated carbon, may be produced. Practice of this invention thus enables production of dry particulate pulverulent free flowing carbon black having enhanced flow imparting characteristics, but unaltered in other apparent physical properties, for employment in applications where such enhanced flow imparting characteristics are desirable. Alakine earth mahogany sulfonates employed according to this invention appear to act as anti-flocculents rather than as dispersing agents. Thus dispersing agents as for example gilsonite, rosin and limed rosin may be included in conventional quantities, say 1% to 5% to increase dispersibility of the treated carbon in liquid media.

The amount of treating material to be used will vary somewhat with the results to be desired but in general the best results are obtained when the carbon is treated with about 2.5% of its weight of the alkaline earth salt. As little as 0.5% will produce a distinct effect and more than 2.5% can be used without harm. When a solution of the alkaline earth salt is employed the solution may contain between 2% and 60% of the alkaline earth mahogany sulfonate by weight, although for many purposes between about 30% and 60% by weight of alkaline earth mahogany sulfonate is preferred.

Generally it is preferred to employ alkaline earth salts of mahogany acids which are substantially free of unneutralized mahogany acids or unneutralized base and in this specification such salts are designated neutral alkaline earth salts of mahogany acids. However, mixtures of mahogany acids and alkaline earth salts of mahogany acids may be usefully employed according to this invention so long as the mixture contains a substantial amount of alkaline earth salt of mahogany acid. Similarly basic alkaline earth mahogany sulfonates which contain an excess of the alkaline earth base may be employed.

The mahogany acids vary in composition within small limits, depending on the source of the material from which they are prepared. However, in each case the alkaline earth salts and particularly the barium salts have a beneficial effect when utilized according to this invention.

While enhancement of the flow characteristic imparted by any carbon black is accomplished by treating the carbon according to this invention, the most striking and significant enhancement of flow characteristics is accomplished in treating relatively short flow carbon blacks. Such enhancement is most efficiently and effectively attained by treatment with a neutral barium salt of mahogany acid.

The flow imparting characteristic of carbon black may be quantitatively determined by testing the flow of a dispersion of the carbon in oil. The relative flow may be determined by observing the spread of an oily dispersion of the carbon being tested when a drop of the dispersion is pressed between two parallel glass plates. The increase in area resulting from the spreading of the dispersion between the plates during stated periods of time may be taken as a function of the length of the carbon. In carrying out such a test a small amount of dispersion, usually ½ cubic centimeter is placed on a flat plate and covered with a piece of flat plate glass which should weigh about 50 grams. The area of the expanding disc of carbon dispersion can be directly observed through the glass plate and is a measure of the relative ability of the dispersions to flow.

The following examples are illustrative of some embodiments of the present invention:

Example 1

Rubber grade channel black in a loose form weighing about 7 pounds per cubic foot was treated by pouring 2.5% of its weight of a neutral barium mahogany sulfonate dissolved in an equal weight of mineral oil onto the surface of the carbon while it was being agitated in a ribbon blender. After the barium salt was distributed the mixture was passed through a screen mill. The resulting carbon was in a fluffy condition and of unchanged appearance but it was very resistant to wetting with water. The experiment was repeated, substituting a fine furnace carbon prepared by burning a heavy tar-like residue from petroleum refining, with substantially the same results. The effectiveness of such treatment may be increased by carrying it out at a considerably elevated temperature. Under such conditions the vapor pressure of the salt is sufficient to assist in a distribution over the surface of the carbon.

Example 2

Rubber grade channel black was suspended in ten times its weight of pentane containing 2.5% of neutral barium mahogany sulfonate based on the weight of the carbon. The mixture was stirred for ten minutes, filtered and the carbon was washed repeatedly with pentane and dried. The dried carbon was analyzed for barium and was found to contain barium equivalent to 90% of that added.

Example 3

Twenty-two parts of the following carbons were each separately mixed on a roller ink mill with seventy-eight parts of #0 linseed oil: (a) untreated rubber grade channel black, (b) rubber grade channel black treated according to Example 1, (c) rubber grade channel black treated according to example 2, and (d) a commercial long flow carbon sold under the trade name of Peerless Mark II. The dispersion formed from the untreated carbon (a) was of a soft buttery consistency and fell in one mass from the end of a spatula. Each of the other dispersions was of a fluid nature and flowed from a spatula in the form of a long thin stream.

Example 4

A dispersion containing 20 percent by total weight of untreated rubber grade channel carbon in mineral oil containing 1.5% by weight of said oil of dissolved gilsonite was prepared on a roller ink mill. Portions of this dispersion were treated with 2.5% (on the weight of the carbon) of various salts of mahogany acid dissolved in an equal weight of mineral oil. For control purposes a like dispersion of carbon was treated with 5% on the total weight of the dispersion of mineral oil. The spreading of the ink between parallel plates was observed and the area of the drop in square centimeters and the percent increase in area after 60 seconds was determined.

| Treating Agent | Area of Drop, Cm.² | Percent Increase in Area |
|---|---|---|
| None (Mineral Oil) | 12.05 | 0 |
| Sodium mahogany sulfonate | 14.25 | 16.8 |
| Mahogany acid | 13.38 | 9.7 |
| Calcium mahogany sulfonate | 16.68 | 36.8 |
| Strontium mahogany sulfonate | 17.30 | 41.8 |
| Neutral barium mahogany sulfonate | 22.90 | 79.5 |
| Barium mahogany sulfonate | 19.00 | 55.8 |

The dispersions containing no treating agent, sodium mahogany sulfonate and mahogany acid would not level out when placed on a flat surface and would not flow in a string from a spatula. All of the dispersions containing alkaline earth mahogany sulfonates leveled quickly on a flat surface and flowed smoothly in a long string from a spatula.

The amount of treating agent to be employed depends on the extent of the results to be desired but usually at least about 0.2% on the weight of the carbon is required to produce a free flowing dispersion.

Example 5

Twenty parts of carbon were treated with 78.5 parts of mineral oil containing 1.5 parts of gilsonite, all parts by weight, and various percentages of a neutral barium mahogany sulfonate based on the weight of carbon. The flow characteristics of the resulting dispersions were determined by the glass plate method and observed also according to the spatula method:

| Percent Treating Agent | Percent increase in Area of Drop | Character of Dispersion |
|---|---|---|
| 0 | 0 | Buttery. |
| .07 | 8.5 | Do. |
| .12 | 21.0 | Do. |
| .20 | 35.4 | Fair flow. |
| .25 | 41.8 | Good flow. |
| .50 | 61.6 | Do. |
| 1.0 | 75.4 | Do. |
| 2.0 | 85.4 | Do. |

The carbon can be treated in any manner which will permit the mahogany sulfonate to become attached to the surface. Since the alkaline earth mahogany sulfonates are solids it is preferred to first bring the sulfonate into solution. This may be accomplished by dissolving the sulfonate in such substances as aliphatic or aromatic oils or solvents or in vegetable oils such as linseed oil. The carbon may then be treated by tumbling, stirring or grinding with the required amount of the solution and the solvent, if volatile, may be allowed to evaporate from the treated carbon. In case the solvent is not volatile it can remain in the carbon and, if present in an amount not exceeding about 15 parts per part of carbon by weight, the carbon will generally appear to be in a normally dry condition.

In other cases the carbon may be treated in a large excess of suspending liquid and may not require to be separated from the suspending liquid for many purposes but may be employed in relatively dilute dispersion. For example, when treated in a non-volatile mineral oil the product can be readily converted to an ink by dilution with the required amount of oils and dispersing aids such as gilsonite.

Various modifications of the alkaline earth mahogany sulfonates are known. For instance complex barium salts containing minor amounts of zinc can be produced. Such salts in which the alkaline earth substance is the predominant metal are satisfactory and considered to be the equivalent of the alkaline earth salts for the treatment of carbon.

Having described my invention, what I claim as new and desire to secure by Letters Patent is:

1. A process for enhancing the flow imparting characteristics of relatively short flow carbon black which comprises contacting said carbon black with a solution of an alkaline earth salt of mahogany sulfonic acid in an oily solvent for said salt.

2. A process for enhancing the flow imparting characteristics of relatively short flow carbon black which comprises contacting said carbon black with a solution of a calcium salt of mahogany sulfonic acid in an oily solvent for said salt.

3. A process for enhancing the flow imparting characteristics of carbon black which comprises contacting said carbon black with a solution of a barium salt of mahogany sulfonic acid in an oily solvent for said salt.

4. A process for enhancing the flow imparting characteristics of relatively short flow carbon black which comprises contacting said carbon black with a solution of a strontium salt of mahogany sulfonic acid in an oily solvent for said salt.

5. A process for enhancing the flow imparting characteristics of relatively short flow carbon black which comprises treating said carbon black with an oil solution containing between about 2% and 60% on the weight of said solution of an alkaline earth salt of mahogany sulfonic acid dissolved therein.

6. A process for enhancing the flow imparting characteristics of relatively short flow carbon black which comprises admixing said carbon black with alkaline earth mahogany sulfonate, said alkaline earth mahogany sulfonate amounting to between about 0.2% and 2.0% by weight of carbon treated and being dissolved in an oily solvent.

7. A process for enhancing the flow imparting characteristics of relatively short flow carbon black which comprises treating said carbon black with an oil solution of neutral alkaline earth mahogany sulfonate, said solution containing between about 30% and 60% by weight of said alkaline earth mahogany sulfonate and the amount of solution employed in treatment containing between about 0.2% and 2.0% by weight of alkaline earth mahogany sulfonate based on the weight of the carbon treated.

8. As a composition of matter, carbon black having alkaline earth salt of mahogany sulfonic acid adsorbed on said carbon black.

9. As a composition of matter, carbon black having barium mahogany sulfonate adsorbed on said carbon black.

10. A dry free-flowing pulverulent carbon black containing alkaline earth mahogany sulfonate in admixture therewith.

11. A dry free-flowing pulverulent carbon black containing a calcium salt of mahogany sulfonic acid in admixture therewith.

12. A dry free-flowing pulverulent carbon black containing a barium salt of mahogany sulfonic acid in admixture therewith.

13. A dry free-flowing pulverulent carbon black containing a strontium salt of mahogany sulfonic acid in admixture therewith.

14. As a composition of matter, carbon black having between about 0.2% and 2% by weight of alkaline earth mahogany sulfonate adsorbed thereon and an oily solvent for said alkaline earth mahogany sulfonate.

15. The composition of claim 14 characterized by the alkaline earth mahogany sulfonate being barium mahogany sulfonate.

16. As a composition of matter, carbon black having between about 0.2% and 2% by weight of alkaline earth mahogany sulfonate adsorbed thereon and containing an oily relatively non-volatile solvent for said alkaline earth mahogany sulfonate in an amount not exceeding about 15 parts per part of carbon by weight.

References Cited in the file of this patent

UNITED STATES PATENTS

| 1,754,297 | Ackerman | Apr. 15, 1930 |
| 1,906,962 | Heckel | May 2, 1933 |
| 2,046,757 | Tucker et al. | July 7, 1936 |
| 2,062,159 | Brizzolara et al. | Nov. 24, 1936 |
| 2,220,952 | Brill | Nov. 12, 1940 |
| 2,610,919 | Kleinholz | Sept. 16, 1952 |
| 2,637,711 | Auer | May 5, 1953 |
| 2,681,315 | Tongberg | June 15, 1954 |